(12) United States Patent
Leung et al.

(10) Patent No.: US 8,266,145 B2
(45) Date of Patent: Sep. 11, 2012

(54) CONTEXTUAL DATA MAPPING, SEARCHING AND RETRIEVAL

(75) Inventors: David Yum Kei Leung, Ajax (CA); Mehdi Ravandi, Richmond Hill (CA)

(73) Assignee: 1759304 Ontario Inc., Ajax (CA)

( * ) Notice: Subject to any disclaimer, the term of this patent is extended or adjusted under 35 U.S.C. 154(b) by 238 days.

(21) Appl. No.: 12/075,207

(22) Filed: Mar. 10, 2008

(65) Prior Publication Data
US 2008/0228761 A1   Sep. 18, 2008

Related U.S. Application Data

(60) Provisional application No. 60/895,264, filed on Mar. 16, 2007.

(51) Int. Cl.
*G06F 7/00* (2006.01)
*G06F 15/18* (2006.01)

(52) U.S. Cl. .......................... 707/736; 706/2
(58) Field of Classification Search .................. 707/736
See application file for complete search history.

(56) References Cited

U.S. PATENT DOCUMENTS

| | | | |
|---|---|---|---|
| 4,918,618 A | 4/1990 | Tomlinson, Jr. | |
| 4,933,872 A | 6/1990 | Vandenberg et al. | |
| 4,951,239 A | 8/1990 | Andes et al. | |
| 5,052,043 A | 9/1991 | Gaborski | |
| 5,802,507 A | 9/1998 | Gentric et al. | |
| 5,812,992 A | 9/1998 | de Vries | |
| 5,930,781 A | 7/1999 | Toomarian et al. | |
| 5,956,634 A * | 9/1999 | Otterson et al. | 455/410 |
| 6,016,384 A | 1/2000 | Gallo | |
| 6,327,550 B1 | 12/2001 | Vinberg et al. | |
| 6,957,203 B2 | 10/2005 | Keeler et al. | |
| 7,321,879 B2 | 1/2008 | Yang et al. | |
| 7,506,274 B2 * | 3/2009 | Zhang et al. | 715/854 |
| 7,765,557 B2 | 7/2010 | Young | |
| 2001/0049671 A1 * | 12/2001 | Joerg | 706/50 |
| 2003/0033347 A1 * | 2/2003 | Bolle et al. | 709/107 |
| 2004/0002964 A1 * | 1/2004 | Kobayashi et al. | 707/3 |
| 2006/0235843 A1 * | 10/2006 | Musgrove et al. | 707/6 |
| 2007/0214097 A1 * | 9/2007 | Parsons et al. | 706/12 |
| 2009/0297000 A1 * | 12/2009 | Shahaf et al. | 382/128 |

OTHER PUBLICATIONS

Valerie Cross, "Fuzzy Information Retrieval", dated Dec. 13, 2004.*

* cited by examiner

*Primary Examiner* — Tarek Chbouki
(74) *Attorney, Agent, or Firm* — Clise, Billion & Cyr, P.A.

(57) ABSTRACT

An example method is illustrated as including receiving a first content set, the first content set organized according to a rules set, using the rules set to parse the first content set to generate a first pattern set having a plurality of members, assigning a weighted value to each member of the first and a second pattern set based on a frequency of occurrence of each member in the first and second pattern sets, wherein each member of the first and second pattern sets includes digital content, and determining a relevancy score linking each of the members of the first and second pattern set in a one to one mapping of the members of the first pattern set to each of the members of the second pattern set, wherein the relevancy score is based upon the weighted value assigned to each member of the first and second pattern sets.

22 Claims, 11 Drawing Sheets

FIG. 10

| HONDA | E1 | E2 | E3 | E4 |
|---|---|---|---|---|
| E1 | 0.0 | 0.6751 | 0.9757 | 0.6667 |
| E2 | 0.6751 | 0.0 | 0.3546 | 0.0 |
| E3 | 0.0 | 0.4432 | 0.0 | 0.1123 |
| E4 | 0.0 | 0.7754 | 0.0 | 0.0 |

CONTEXTUAL DATA MAPPING, SEARCHING AND RETRIEVAL

CROSS REFERENCE TO RELATED APPLICATIONS

This is a non-provisional patent application claiming priority under 35 USC §119(e) to U.S. Provisional Patent Application No. 60/895,264 filed on Mar. 16, 2007 entitled "CONTEXTUAL DATA MAPPING, SEARCHING AND RETRIEVAL" which is incorporated by reference in its entirety.

TECHNICAL FIELD

The present application relates generally to the technical field of commercial uses of search algorithms implemented on a computer and, in one specific example, the use of such algorithms to find relationships in searchable content.

BACKGROUND

Search algorithm applied in the context of the Internet are typically static (e.g., static search algorithms) in terms of their ability to search content appearing on a web page. Specifically, rather than making predictions about what search results may or may not be optimal for a given search, these static search algorithms tend to retrieve search results that are based upon the content of pages alone. For example, the number of links to a web page including searchable content may be used to determine a particular web page's ranking in a search result (e.g., the greater the number of links to a web page, the higher the ranking).

BRIEF DESCRIPTION OF THE DRAWINGS

Some embodiments are illustrated by way of example and not limitation in the figures of the accompanying drawings in which:

FIG. 10 is a diagram of an optimized model in the form of a matrix representation of entity data in the form of relevancy scores between pairs of entities, according to an example embodiment.

DETAILED DESCRIPTION

Figure 1:
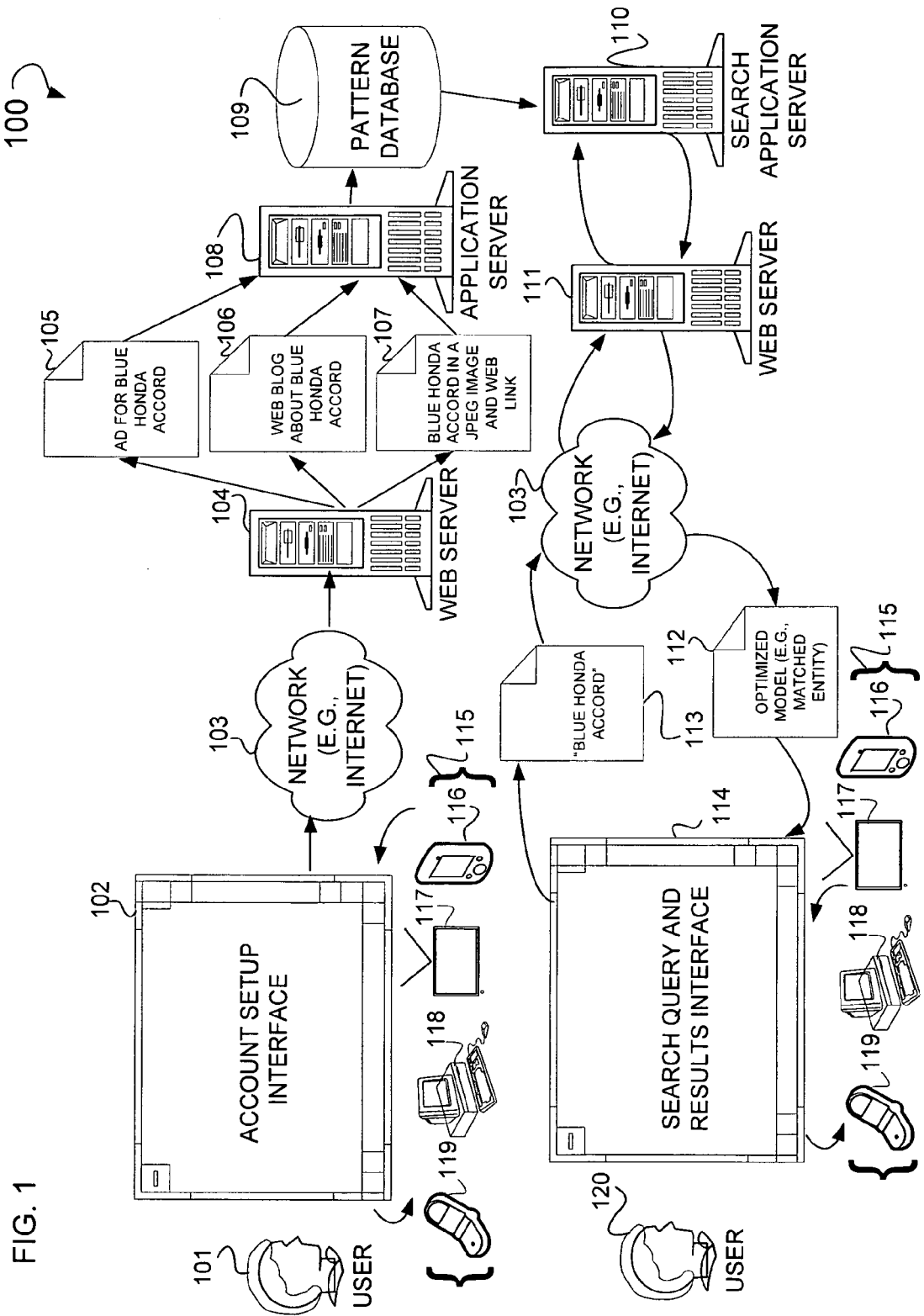
FIG. 1 is a diagram of a system 100 illustrating the utilization of an account setup interface and search query interface to provide and search for different types of relationships, according to an example embodiment.

In the following description, for purposes of explanation, numerous specific details are set forth to provide a thorough understanding of example embodiments. It may be evident, however, to one skilled in the art, that the present invention may be practiced without these specific details.

In some embodiments, contextual data mapping, searching, and retrieval is illustrated. Example embodiments may include a system and method to provide optimized search results based upon analyzed digital content that may appear in, for example, a web page, or other type of suitable digital content. This digital content may be optimized using any one of a number of Artificial Intelligence (AI) algorithms either independently or in combination with one another. For example, using a Fuzzy Logic algorithm, the relevance (R1) between two entities may be determined as well as the structural relationship (R2), and the related relevancy (R3). Collectively. R1, R2, and R3 may be combined into a relevancy score. An entity may be understood to be an aggregation of member data such as web pages referencing a particular phrase (e.g., web pages referencing a "Honda Accord"), where this phrase is understood to be associated with a particular user. Member data may be understood as data that is a member of a pattern set.

Some example embodiments may include an R1, R2 or R3 value defined as some type of relationship between two or more entities based upon member data. This relationship may be a score (e.g., a Fuzzy Logic score) between two entities. Each entity, and/or each member that makes up the entity, may be a node in a graph where the scores serve as links (e.g., edges) between the nodes. Using certain mathematical principles (e.g., an LP algorithm) nodes with the maximum or even minimum relatedness may be found. Within the context of an R1 value, an entity with the greatest probability of having the phrase "Honda Accord" associated with it may be retrieved. This greatest probability may be based upon searching for the highest Fuzzy Logic score in a given graph using an LP algorithm.

Example embodiments may include using Fuzzy Scores and LP to determine entities with the closest R2 values. For example, if a search is conducted to determine which entities that include references to the phrase "Honda Accord" have the closest physical proximity, or even the closest proximity on the Internet (e.g., have the least number of hops between them), this may be determined through using Fuzzy Scores and LP. Specifically, a Fuzzy score could be associated with two of more entities based upon physical distance, where the scores again serve as links between entities in the form of nodes. LP could be applied to find the greatest or smallest physical distance between two or more entities.

In some embodiments, Fuzzy Scores and LP may be used to determine entities with the closest R3 values. For example, if a search is conducted to determine which entities that include references to the phrase "Honda Accord" have the closest relevance based upon synonyms for this phrase, such a relevance may be determined using a Fuzzy score and an LP. That is, the phrase "Honda Accord" and "Honda Sedan" may have a Fuzzy score associated between them, such that each of the phrases are nodes in a graph, where each node has a link in the form of a Fuzzy score. An algorithm for computing R1, R2 and R3 using Fuzzy Scores and LP is more fully illustrated below.

Example Overview of a System

In some embodiments, an interface is provided to allow a user to provide entity data in the form of web pages, or other types of digital content, wherein this digital content is the previously referenced member data. This interface may be, for example, a Graphical User Interface (GUI), or may be an Application Programming Interface (API) that allows one to provide entity data as an eXtensible Markup Language (XML) based file.

This member data that makes up entity data may include a web page encoded in, for example, a Hyper Text Markup Language (HTML), an image encoded in a Joint Motion Picture Experts Group (JPEG), or even a file encoded as a Motion Pictures Expert Group (MPEG) file. In one example embodiment, this digital content is analyzed at the bit level (e.g., the bit patterns may be analyzed) such that a high level of granular analysis can be achieved. As may be more fully illustrated below, the various codecs that are used to encode this digital content are used in the course of determining R1, R2, and R3 values.

FIG. 1 is a diagram of an example system 100 illustrating the utilization of an account setup interface and a search query interface to provide and search for different types of relationships between entities. Illustrated is a user 101 who, utilizing an account setup interface 102 that resides in any one of a number of devices 115, sets up an account. These various devices 115 may include, for example, a Personal Digital Assistant (PDA) 116, a television 117, a computer system 118, a cell phone 119, or some other suitable device. This account setup interface 102 may be used to set up an account whereby the user 101 may supply various types of member or relevancy data via the account setup interface 102. Once received by the account setup interface 102, this member data is transmitted over a network 103 to a web server 104. This member data may be, for example, an on-line ad, such as ad 105, a web blog entry, such as web blog entry 106, an image such as a Joint Pictures Expert Group (JPEG) image 107, or some other form of digital content. These various types of member data (e.g., 105-107) are then sent to an application server 108, and ultimately stored into a pattern database 109. Next, a user 120 performing a search or inquiry regarding relevant types of member data and/or entities may utilize a search query and results interface 114 that resides on any one of a number of the previously illustrated devices 115. For example, this user 120 utilizing the search query and results interface 114 may conduct a string text search 113 for a "Blue Honda Accord." This string text search 113 (e.g., a search query) may be transmitted over the network 103 to a web server 111, or, in some example cases, even to the web server 104. Once received by the web server 111, this search query 113 is transmitted to a search application server 110. This search application server 110 retrieves a set of member data from the pattern database 109. Once retrieved, the search application server 110 transmits this pattern data in the form of an optimized model 112 which contains, for example, a matched entity corresponding to the search query conducted by user 120. Then, it transmits this optimized model 112 across a network 103. In other example cases, the search application server 110 transmits this optimized model 112 to the web server 111, which, in turn, transmits the optimized model 112 across the network 103 ultimately to the requesting user 120. The requesting user 120 may receives and review this optimized model 112 via the previously illustrated search query and results interface 114. The account setup interface 102 and search query and results interface 114 may be a browser-based GUI or an interface for a web-enabled (e.g., a Transmission Control Protocol/Internet Protocol (TCP/IP) utilizing application) stand-alone application.

Figure 2:
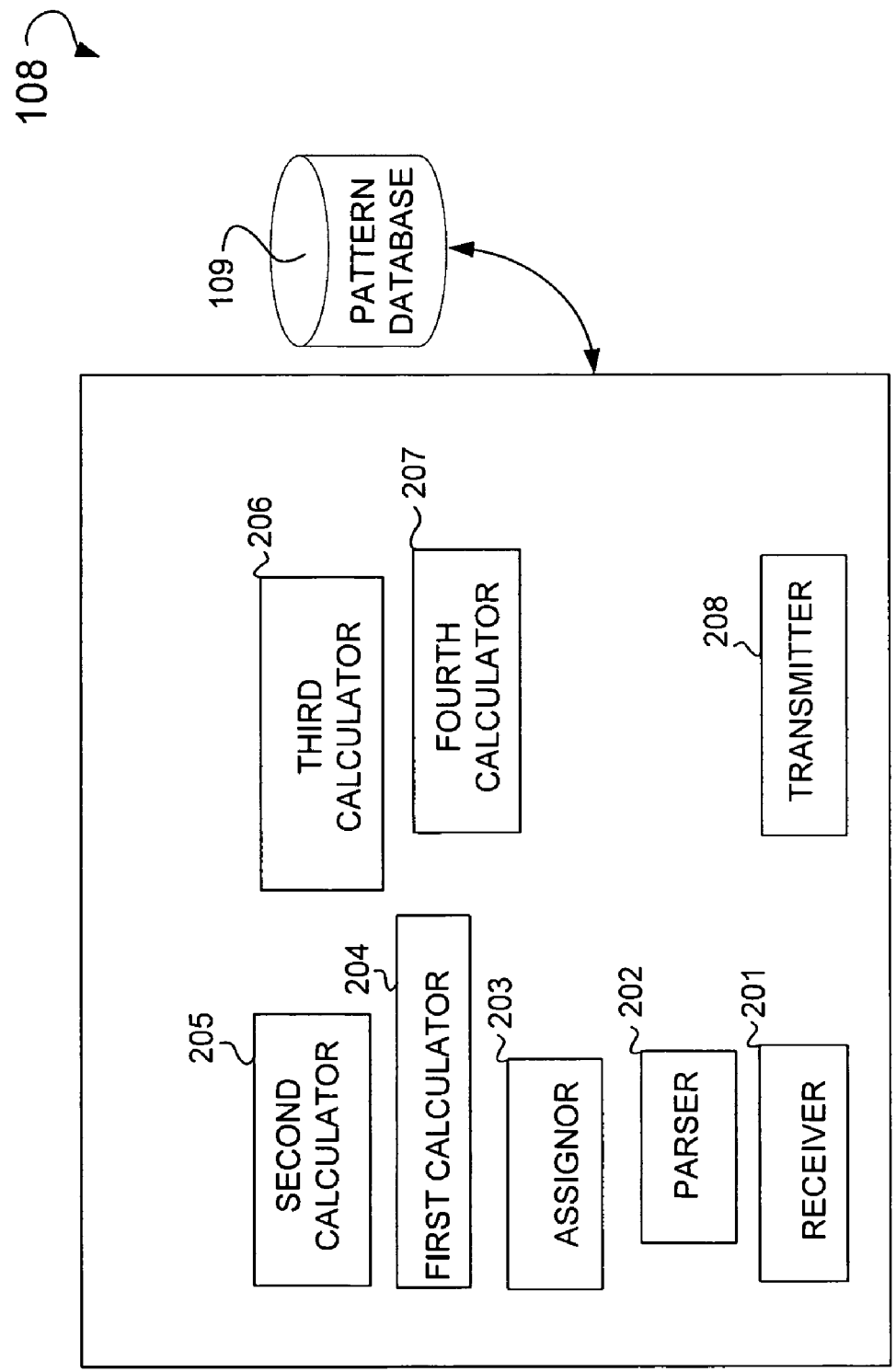
FIG. 2 is a block diagram of an application server and the various modules that may reside thereon, according to an example embodiment.

FIG. 2 is an example block diagram of an application server 108 and various modules that may reside thereon. These modules may be implemented in hardware, firmware, or software. Illustrated is a receiver module 201 that receives a first content set, wherein the first content set is organized according to some rule set. This receiver module 201 may be a network adaptor card that provides for a network interface between an application server 108 and a network 103 (shown in FIG. 1). Further illustrated is a parser module 202 that parses the first content set to generate a pattern set. This parser module 202 may use some type of predefined grammar (e.g., a rules set) with which to parse the first content set, where this first content set contains binary data. This grammar may include any one of a number of codecs that are known in the art, such as the previously illustrated JPEG codec, an MPEG codec, a Portable Document Format (PDF), or some other suitable codec. Next, an assignor module 203 assigns a weighted value (e.g., a Fuzzy Logic score) to each member of the pattern set generated using the parser module 202. This weighted value may be, for example, the number of times that a particular member of the pattern set appears in the pattern. Further illustrated is a first calculator module 204 that determines a relevancy score for every members of the pattern set and for every member of a second pattern set based upon some common weighted value. This relevancy score may be based upon some type of Fuzzy Logic score and may represent the correspondence between, for example, two member sets of data. These member sets may include, for example, a correspondence between one or more text strings illustrating, for example, a text string such as "Blue Honda Accord" that may be associated with two entities. Additionally, illustrated is a second calculator module 205. This second calculator module 205 may help to facilitate the traversal of a data structure to find the highest relevancy between a first and second member of one or more pattern sets. This data structure may be, for example, a binary search tree, a heap, a stack, a queue, a red-black tree, or some other suitable data structure. Additionally, illustrated is a third calculator module 206 that assigns a weighted value based upon one or more weighting types, wherein these weighting types are selected from, for example, relevancy weighting, relationship weighting, and/or review weighting (e.g., R1, R2, and/or R3). Further, illustrated is a fourth calculator module 207 that applies one or more constraint values to the previously illustrated relevancy score where these constraint values are selected from a group including, for example, a fastest to locate value, an easiest to access value, and/or a co-expected relevancy value. Further, illustrated is a transmitter module 208 that facilitates the transmission of, for example, an optimized model such as optimized model 112 (e.g., as shown in FIG. 1). This transmitter module 208 may be a network adaptor card that provides for a network interface between an application server 108 and a network 103. In some cases the previously illustrated pattern database 109 is operatively coupled to the application server 108.

Example AI Algorithms

In some embodiments, various AI algorithms are implemented on the application server 108. These AI algorithms may be used to optimize search results, and are included in an AI library 604 (as will be illustrated in FIG. 6). The AI algorithms included in this AI library 604 may be thought of as falling into one of two categories of AI algorithms: deterministic or stochastic. One distinguishing feature of stochastic algorithms, as compared to deterministic algorithms, is that the former may use some sort of non-deterministic feature such as random number generation or random node selection (see, e.g., Genetic algorithms) in its optimization analysis, while the later avoids such random, non-deterministic features. This random number generation may allow for the avoidance of pitfalls such as slavish adherence to predictability criteria during the optimization process. Some embodiments may include the use of deterministic or stochastic algorithms in combination (see e.g., Genetic Fuzzy algorithms).

Some example embodiments may include any number of deterministic algorithms implemented in the AI library 604, including case-based reasoning, Bayesian networks (including Hidden Markov Models), neural networks, or Fuzzy systems. The Bayesian networks may include: Machine learning algorithms including Supervised learning, Unsupervised learning, Semi-supervised learning, Reinforcement learning, Transduction, Learning to learn algorithms, or some other suitable Bayesian network. The neural networks may include: Kohonen self-organizing network, Recurrent networks, Simple recurrent networks, Hopfield networks, Stochastic neural networks, Boltzmann machines, Modular neural networks, Committee of machines, Associative Neural Network (ASNN), Holographic associative memory, Instantaneously trained networks, Spiking neural networks, Dynamic neural networks, Cascading neural networks, Neuro-Fuzzy networks, or some other suitable neural network.

Some embodiments may include the use of a Fuzzy Neural Network to conduct searches. For example, a bit pattern of a piece of member data may be represented as:

$$P_n = \Sigma f_i p_i / n$$

where: n is the total number of known patterns in the system;
i is 0 to n;
$p_i$ is 1 if the bit pattern (word) or co-related patterns exists; and
f is the fuzziness of a pattern towards another pattern.

The equation may be applied in the following example. An Entity 1 exists that has members (e.g., member data or textual content) of bit patterns representing the words ("Honda," "Civic," and "Accord") with Fuzzy memberships of: 0.8, 0.6, and 0.4. Further, an Entity 2 exists that has members (e.g., member data or textual content) of bit patterns representing the words ("Honda," "Accord," and "EuroR") with Fuzzy memberships of 0.9, 0.5, and 0.5. Assume that:
Let Entity 1 be the entity of interest to match to other Entities.
Let input1=1, if looking for Honda and both exist in entities pair, else input1=0;
Let input2=1, if looking for Civic and both exist in entities pair, else input2=0;
Let input3=1, if looking for Accord and both exist in entities pair, else input3=0; and
Let input4=1, if looking for EuroR and both exist in entities pair, else input4=0.
In some embodiments, these various conditional statements may be placed into a decisional tree, matrix, or other type of suitable data structure.

In some embodiments, once the entities are defined and the conditions determined, then the entities are passed through a number of stages of analysis. These stages of analysis may correspond to the input layer (e.g., here referenced as a first layer neuron), a hidden layer (e.g., here referenced as a second layer neuron), and an output layer (e.g., here referenced as a third layer neuron) of a neural network. For example, in a Stage 1 of analysis, various inputs in the form of neuron inputs are translated as is into a second level artificial neuron such that:

$$Input1 \rightarrow P_n = \Sigma f_i p_i / n$$

$$Input2 \rightarrow P_n = \Sigma f_i p_i / n$$

$$Input3 \rightarrow P_n = \Sigma f_i p_i / n$$

$$Input4 \rightarrow P_n = \Sigma f_i p_i / n$$

These inputs are then used to evaluate the entities (e.g., in a Stage 2 analysis) such that if we are matching Entity 1 and Entity 2, then:

$$P(Honda) = (f(0.8 \cap 0.9)1)/1 = \min(0.8, 0.9)/1 = 0.8$$

$$P(Civic) = (f(0.6 \cap 0)0)/1 = (\min(0.6, 0)0)/1 = 0$$

$$P(Accord) = (f(0.4 \cap 0.5)1)/1 = \min(0.4, 0.5)/1 = 0.4$$

$$P(EuroR) = (f(0 \cap 0.5)0)/1 = (\min(0, 0.5)0)/1 = 0$$

Values arising from Stage 2 reflect certain minimum values the entities have in common. Once this Stage 2 is complete, then a Stage 3 is executed wherein:

$$|f(Honda) - P(Honda)| = |0.8 - 0.8| = 0$$

$$|f(Civic) - P(Civic)| = |0.6 - 0| = 0.6$$

$$|f(Accord) - P(Accord)| = |0.4 - 0.4| = 0$$

$$|f(EuroR) - P(EuroR)| = |0 - 0| = 0$$

Next, the combined fuzziness deviation (e.g., the 0.6 value) from all the combined patterns is determined by a Fuzzy OR statement having the form:

$$|f(Honda) - P(Honda)| \cup |f(Civic) - P(Civic)| \cup |f(Accord) - P(Accord)| \cup |f(EuroR) - P(EuroR)|$$

$$\text{Max}(0, 0.6, 0, 0) = 0.6$$

These three stages of analysis, including the use of, for example, a decisional tree, may then be applied to all entities such that an example optimal solutions may have the lowest final score (e.g., is the closest match to the entity of interests). Some embodiments may include the optimal solution as having the highest final score.

Further, example embodiments may include a case where after the closest matches are presented to a user, and the user starts interacting with and reacting to the entity, more patterns may be generated. For example, if the user (e.g., Entity #1) interacts with Entity #2, and generates the word or string "JDM," which shows up 5 times as part of a member data set, and the word "Car," which shows up 10 times during the interaction in a member data set, then the co-related fuzziness of the words, for example, becomes:

$$(Honda \leftrightarrow JDM) = 0.5$$

$$(Civic \leftrightarrow JDM) = 0.5$$

$$(Accord \leftrightarrow JDM) = 0.5$$

$$(EuroR \leftrightarrow JDM) = 0.5$$

(Honda<->Car)=1

(Civic<->Car)=1

(Accord<->Car)=1

(EuroR<->Car)=1

The result of these calculations may then be used as a training set for subsequent implementations of the Fuzzy neural network. Specifically, the above calculations could be, for example, represented in a training mode using a decisional tree such that:

Let Entity 1 be the entity of interest to match to other Entities.
Let input1=1, if looking for Honda and both exists or co-related words exists in entities pair, else input1=0;
Let input2=1, if looking for Civic and both exists or co-related words exists in entities pair, else input2=0;
Let input3=1, if looking for Accord and both exists or co-related words exists in entities pair, else input3=0;
Let input4=1, if looking for EuroR and both exists or co-related words exists in entities pair, else input4=0;

Again, applying stage 1-3, the artificial neuron inputs are translated as is into the second level artificial neuron such that:

$$\text{Input1->}P_n=\Sigma f_i p_i/n$$

$$\text{Input2->}P_n=\Sigma f_i p_i/n$$

$$\text{Input3->}P_n=\Sigma f_i p_i/n$$

$$\text{Input4->}P_n=\Sigma f_i p_i/n$$

Next applying Stage 2, the artificial neurons evaluate such that if we are matching Entity 1 and Entity 2, then:

$$P(\text{Honda})=(f(0.8\cap 0.9)+f(0.5\cap 0.5)+f(1\cap 1))/3=(\min(0.8,0.9)+\min(0.5,0.5)+\min(1,1))/3=0.7667;$$

$$P(\text{Civic})=(f(0.6\cap 0)0+f(0.5\cap 0.5)+f(1\cap 1)))/3=(0+\min(0.5,0.5)+\min(1,1))/3=0.5;$$

$$P(\text{Accord})=(f(0.4\cap 0.5)+f(0.5\cap 0.5)+f(1\cap 1))/3=(\min(0.4,0.5)+\min(0.5,0.5)+\min(1,1))/3=0.6333;\text{ and}$$

$$P(\text{EuroR})=(f(0\cap 0.5)0+f(0.5\cap 0.5)+f(1\cap 1))/3=(0+\min(0.5,0.5)+\min(1,1))/3=0.5.$$

Applying Stage 3 artificial neurons evaluate such that:

$$|f(\text{Honda})-P(\text{Honda})|=|0.8-0.7667|=0.0333;$$

$$|f(\text{Civic})-P(\text{Civic})|=|0.6-0.5|=0.1;$$

$$|f(\text{Accord})-P(\text{Accord})|=|0.4-0.6333|=0.2333;\text{ and}$$

$$|f(\text{EuroR})-P(\text{EuroR})|=|0-0.5|=0.5.$$

As with the above illustrated three-stage analysis, the combined fuzziness deviation from all the combined patterns is determined by Fuzzy OR, which is then determined as:

$$|f(\text{Honda})-P(\text{Honda})|\cup|f(\text{Civic})-P(\text{Civic})|\cup|f(\text{Accord})-P(\text{Accord})|\cup|f(\text{EuroR})-P(\text{EuroR})|$$

$$\text{Max}(0.0333,0.1,0.2333,0.5)=0.5$$

In some embodiments, as more interactions and reactions happen, each pattern may have more co-related patterns generated, and the system may go into machine learning stage. A diversity of co-related patterns may arise as the users interact with the system more and more. Moreover, in some embodiments, the same may apply for the context of structural relationships, but the number of clicks, or the change of number of hops apart, or the change of physical distance apart may be replaced with the bit patterns and co-related patterns.

In addition to deterministic algorithms such as a Fuzzy neural network, any number of stochastic algorithms may be implemented, including: Genetic algorithms, Ant algorithms, Tabu search algorithms, or Monte Carlo algorithms (e.g., Simulated Annealing). Common to these algorithms is the use of randomness (e.g., randomly generated numbers) to avoid the problem of being unduly wedded to a local minima or maxima.

In some embodiments, a Fuzzy Genetic algorithm is implemented that can be understood as incorporating the features of both a deterministic and stochastic algorithm. Applied in the present context, a Genetic algorithm could be used to optimize the set of member data, or even entities, using principles of crossover and mutation that incorporate certain concepts of randomness in the selection of the member data. This process of crossover and mutation may be repeated until diversity is established, based upon some predefined criteria (e.g., all member data with the exception of certain types of elite data are subjected to crossover and/or mutation at least once). In some embodiments, a principle of elitism may be applied whereby certain relationships between certain entities are not subjected to cross over or mutation due to the fact that these entities have a high level of correspondence between their member data (e.g., the Fuzzy Scores between their member data tend to reflect a high level of correspondence). Further, in some embodiments, a principle of unfitness may be applied such that certain types of member data may not be combined due to the fact that historically a particular type of member data has shown a lack of relevance to any other member data, or the present member data with which it is being combined. In some embodiments, the principles of elitism and unfitness may lessen the number of combinations that may be computed, possibly saving computing time. Further, as previously alluded to, a Genetic algorithm may allow for new relationships to be explored through the randomness of cross over and mutation, randomness that by definition may not be wholly tied to historical data (e.g., a data training set).

In some example cases, once diversity is established, then a Fuzzy Associative matrix may be generated illustrating all the Fuzzy Scores for each of the combinations of member data for each entity. An example Fuzzy Associative matrix is provided below:

|  | Entity 1 | | |
| --- | --- | --- | --- |
| Entity 2 for | Honda Civic | Honda Accord | Honda Odyssey |
| Honda Accord | 0.67 | 0.13 | 0.32 |
| Honda Odyssey | 0.56 | 0.32 | 0.78 |
| Honda Civic | 0.15 | 0.67 | 0.56 |

The value displayed in this matrix may be computed through applying one of the above illustrated calculations and intersection ($\cap$) operations. (See e.g., FIG. 7). Further, these values may be searched using an LP algorithm as previously illustrated. In some embodiments, the values in the above matrix are inserted into a data structure such as an array, tree (e.g., a binary search tree, red-black tree), list, stack or query, wherein the type of data structure used may be dictated by the efficiency of searching the data structure for a given data set size. Further, a table may be generated for every combination of entities generated using the Genetic algorithm.

Figure 3:
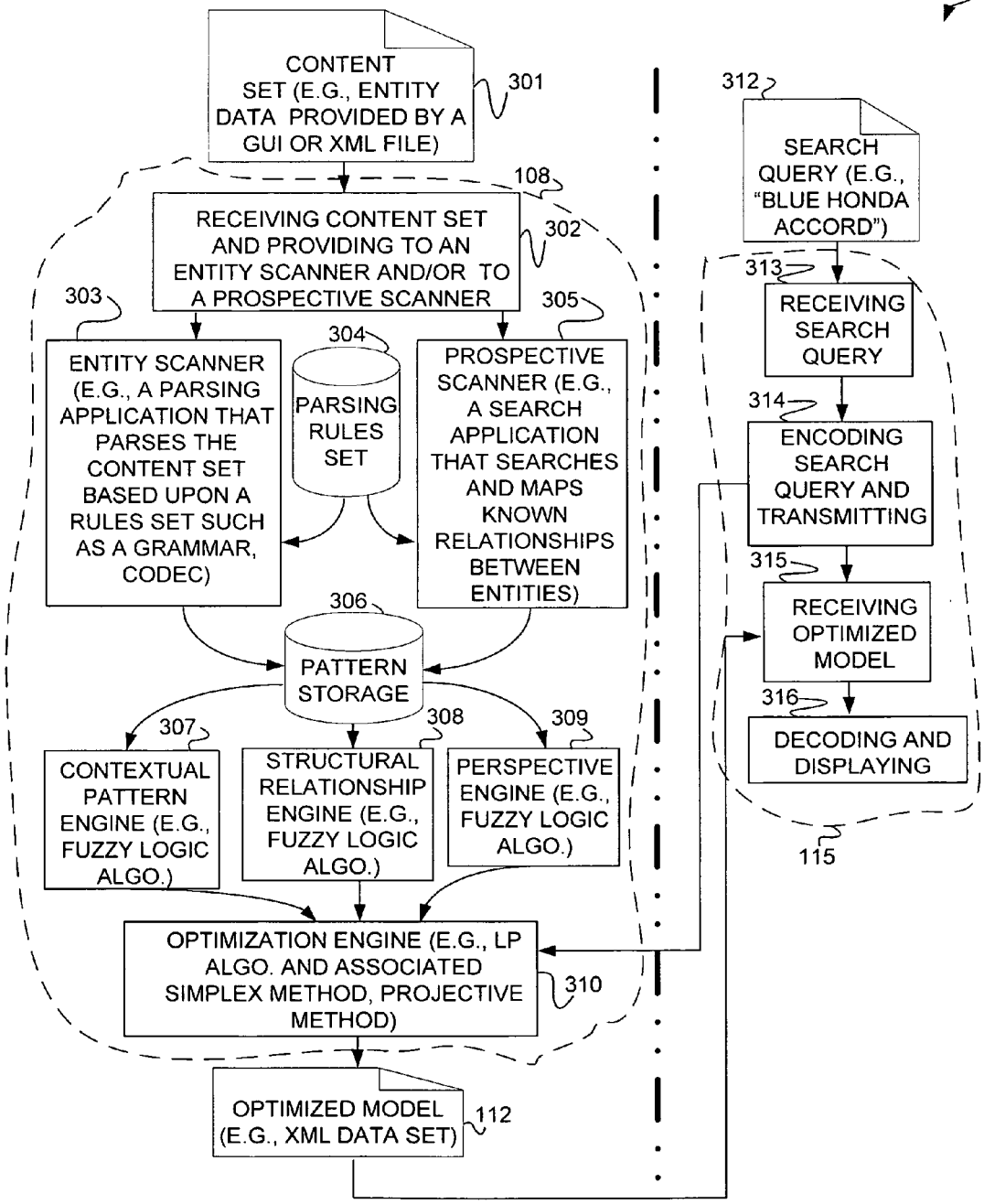
FIG. 3 is a flowchart of a method to perform a relevancy, structural relevancy, and related relevancy analysis, according to an example embodiment.

FIG. 3 is a flowchart of an example method 300 wherein this flowchart is a dual-stream flowchart. Illustrated is a first stream titled: "Model Generation," wherein content set 301, which may provided by a user 101 via an account setup interface 102, is provided to an operation 302. The operation 302, when executed, receives a content set and provides this content set to an entity scanner and/or prospective scanner operations. An operation 303 is executed that acts as an entity scanner, which parses the content set 301 based upon a rules set such as a grammar, a codec, or some other grammar set. Further, the content set 301 may be transmitted by the operation 302 to an operation 305 that acts as a prospective scanner operation. This operation 305, when executed, may search for known relationships between entities based upon the content set 301. The grammar for the operations 303 and 305 may be provided by a parsing rules set database 304. The content set 301 may be stored into a pattern storage database 306.

In some example embodiments, various operations 307, 308, and 309 are shown. These operations may generate each of the R1, R2 and R3 values respectively (collectively, relevancy scores). Shown is the operation 307 that, when executed, may determine the contextual pattern for a particular content set. This operation 307 may be referred to as a contextual pattern engine. Some embodiments may include the operation 307 executed to determine a relevancy value (e.g., R1 value) between member data sets corresponding to two entities.

Some example embodiments may include an operation 308 that, when executed, determines a structural relationship between two or more entities and their member sets of data. Operation 308 may act as a structural relationship engine. A structural relationship may be defined in terms of the physical proximity (e.g., in terms of kilometers (km), or some other measure of distance) of two entities based upon the member data sets, or proximity as defined in terms of some type of internet hop value. This structural relationship may be understood as an R2 value.

Some example embodiments may include an operation 309 that, when executed, acts as a perspective engine. Specifically, with regard to operation 309, the co-relevancy value may be determined based upon the perspectives of two or more entity values that are compared to a particular target set of data. This relevancy value may be an R3 value. For example, the perspective of a first entity and a second entity may be compared on the basis of how their member sets of data reflect their views towards, for example, the member data set including "Blue Honda Accord" as a searched term.

Common to the operations 307 through 309 is the usage of a Fuzzy Logic algorithm to generate a Fuzzy Logic score (e.g., a weighed value) to be used to determine a relevancy (e.g., in the form of a relevancy score) between certain members of a plurality of data sets of entities. As may be more fully illustrated below, other types of AI logic and algorithms, or combinations thereof, may be utilized.

An operation 310 may be executed whereby an LP algorithm is applied to the Relevancy Scores generated by each of the operations 307 through 309. This operation 310, referred to herein as an optimization engine, may seek to find a maximum or minimum value associated with the relevancy scores (e.g., R1-R 3 values) generated by operations 307 through 309. In some example cases, this LP algorithm may implement a Simplex Method or Projective Method (e.g., Karmarkar Algorithm) to provide for near polynomial time (e.g., O(N)).

In some example cases, the content set 301 may be interactive in nature, while in other cases it may be reactive in nature. For example, this content set 301 may include data generated by the web server 104 and/or application server 108 passively monitoring a user (e.g., user 101) interacting with or generating data by interacting with, for example, any one of a number of web pages, web blogs, message boards, or other types of digital content that may appear on, for example, an Internet. Still, in other cases, this user 101 may generate data interactively in the form of member data sets by virtue of the search queries that a user conducts utilizing the application server 108 and/or web server 104. In some example cases, as may be illustrated below, this member data set may be generated interactively or reactively and may serve as a training set, or a data training set, for any one of a number of AI algorithms.

In some example embodiments, further illustrated is the second stream of the dual stream flowchart titled: "Model Retrieval." Illustrated for method 300 is a search query 312, wherein a search is conducted, for example, for the text string "Blue Honda Accord." This search query 312 is provided to an operation 313 that receives a search query. An operation 314 may be executed that encodes the search query and transmits it. This encoded search query is provided to the previously illustrated operation 310 which generates the optimized model 112 (shown in FIG. 1). This optimized model 112 is provided to an operation 315. This operation 315 resides on any one of a number of devices 115 as do, for example, the previously illustrated operations 313, 314, and an operation 316. Operation 316, when executed, decodes and displays the optimized model 112.

In some example embodiments, a method is illustrated as being executed by operations residing on the application server 108. This method includes receiving a first content set (see e.g., content set 301), wherein the first content set is organized according to a rules set. The rules set is used to parse the first content set to generate a first pattern set having a plurality of members (see e.g., operation 303). The method may also include assigning a weighted value to each member of the first and a second pattern set based on a frequency of occurrence of each member in the first and second pattern set, wherein each member of the first and second pattern set includes digital content (see e.g., operations 307, 308 and 309). The method may include determining a relevancy score and linking this score to each of the members of the first and second pattern set in a one-to-one mapping of the members of the first pattern set to each of the members of the second pattern set, wherein the relevancy score is based upon the weighted value assigned to each member of the first and second pattern set (see e.g., operation 305). Further, this method may include storing each member of the first and second pattern set in a data structure (see e.g., pattern storage database 306). Additionally, this method may include executing an algorithm to find a highest relevancy score linking a member of the first pattern set and a member of the second pattern set, wherein the algorithm is a linear programming algorithm (see e.g., operation 310). Additionally, the method may include assigning the weighted value based upon one or more weighting types including at least one of relevance weighting (see e.g., operation 307), relationship weighting (see e.g., operation 308), and review weighting (see e.g., operation 309), wherein the weighted value includes a Fuzzy Logic score. Additionally, the method may include applying one or more constraint values to the relevancy score, wherein the constraint value includes at least one of a fastest to locate value, an ease of access value, and a co-expected relevancy value. Further, the digital content may include at least one of web pages, on-line blog entries, on-line chat entries, on-line bulletin board postings, and social network postings. In addition, in some example cases, the method may further include presenting the highest relevancy score for one or more members of the first and second pattern sets as an optimized model.

Figure 4:
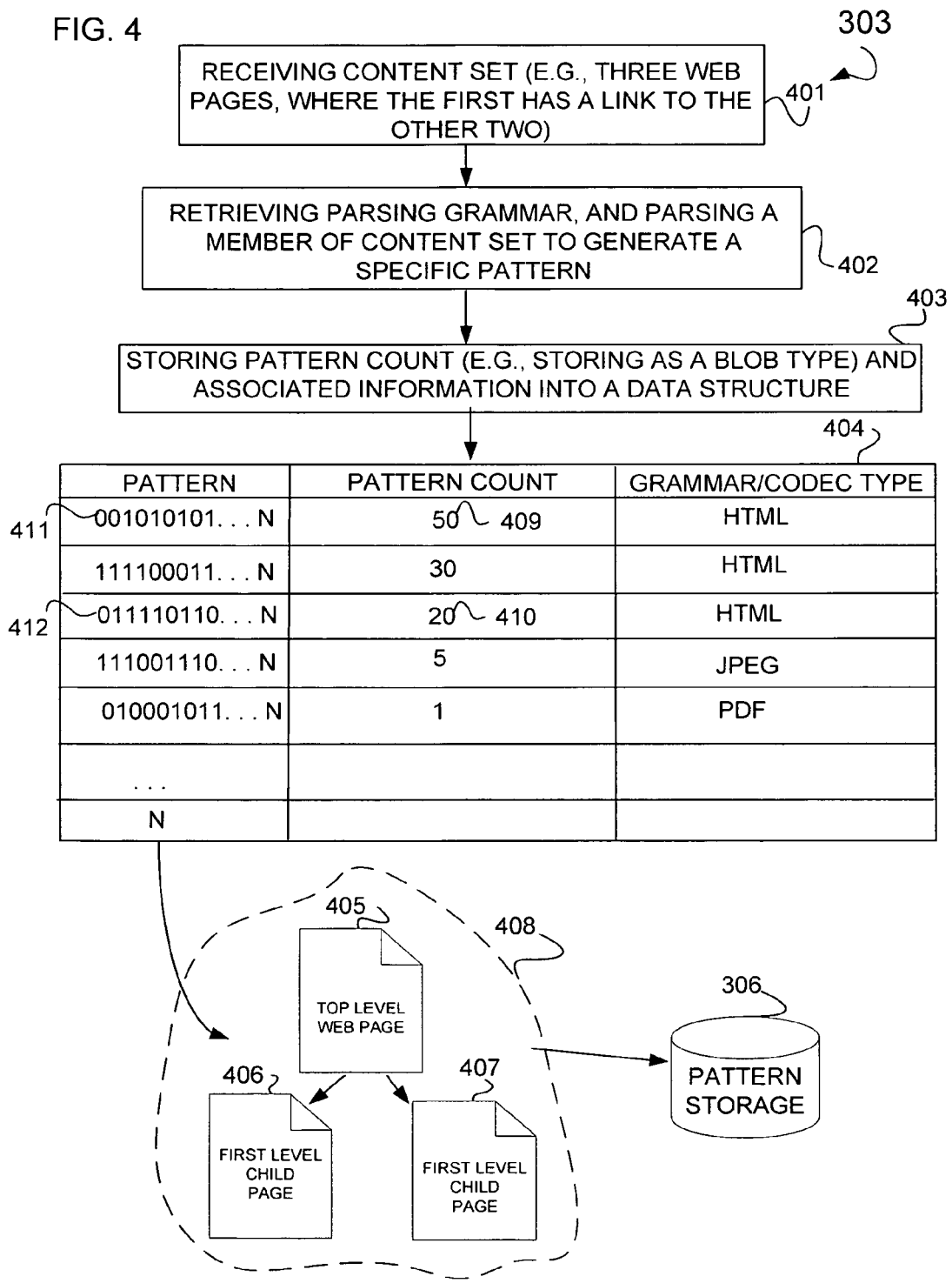
FIG. 4 is a flowchart illustrating a method used to implement an operation to perform entity scanning, according to an example embodiment.

FIG. 4 is a flowchart illustrating an example method used to implement operation 303. Illustrated is an operation 401 that, when executed, receives a content set. This content set may be, for example, the previously illustrated content set 301 and may include linked web pages where a first web page is linked to two subsequent web pages, wherein the first web page may be a parent of the two subsequent web pages and these two subsequent pages may be understood to be child pages. Operation 402, when executed, retrieves a parsing grammar from, for example, the parsing rule set database 304, and parses the content set 301 to generate a specific pattern (e.g., a pattern set). Operation 403, when executed, stores pattern count information, wherein this pattern count information may include storing various types of data derived from (e.g., parsed from) the content set 301. Table 404 illustrates this data derived from the content set 301. For example, a first column titled "Pattern" is illustrated as is a second "Pattern Count" column and a "Grammar/Codec Type" column. With regard to the Pattern column, this column may include data in the from of Binary Large Object (BLOB) data (e.g., a binary representation of the member data associated with an entity) such as a bit pattern reflecting the bit pattern of data included in the content set. For example, the previously illustrated image 107 (e.g., a JPEG) may be included as a tuple entry in this Pattern column as a single BLOB entry. Similarly, a web blog entry such as web blog entry 106 may be included as a tuple entry (e.g., 411) in the form of a BLOB, where this tuple entry 411 has a pattern count of 50 (e.g., 409). Further, a tuple entry 412 is illustrated which has a bit pattern and is illustrated herein as having a pattern count of 20 (e.g., 410). In some example cases, the relationship between a parent page and its children pages can be reflected in tree 408, where the parent node 405 is a top level webpage, and its children are first level child node 406, and first level child node 407. This tree 408 may be stored in the previously illustrated pattern storage database 306. In some example cases, a data structure other than a tree may be used to represent the relationship between various types of member data included in a content set. These data structures may include, for example, lists, queues, stacks, binary search trees, red black trees, or some other suitable data structure.

Figure 5:
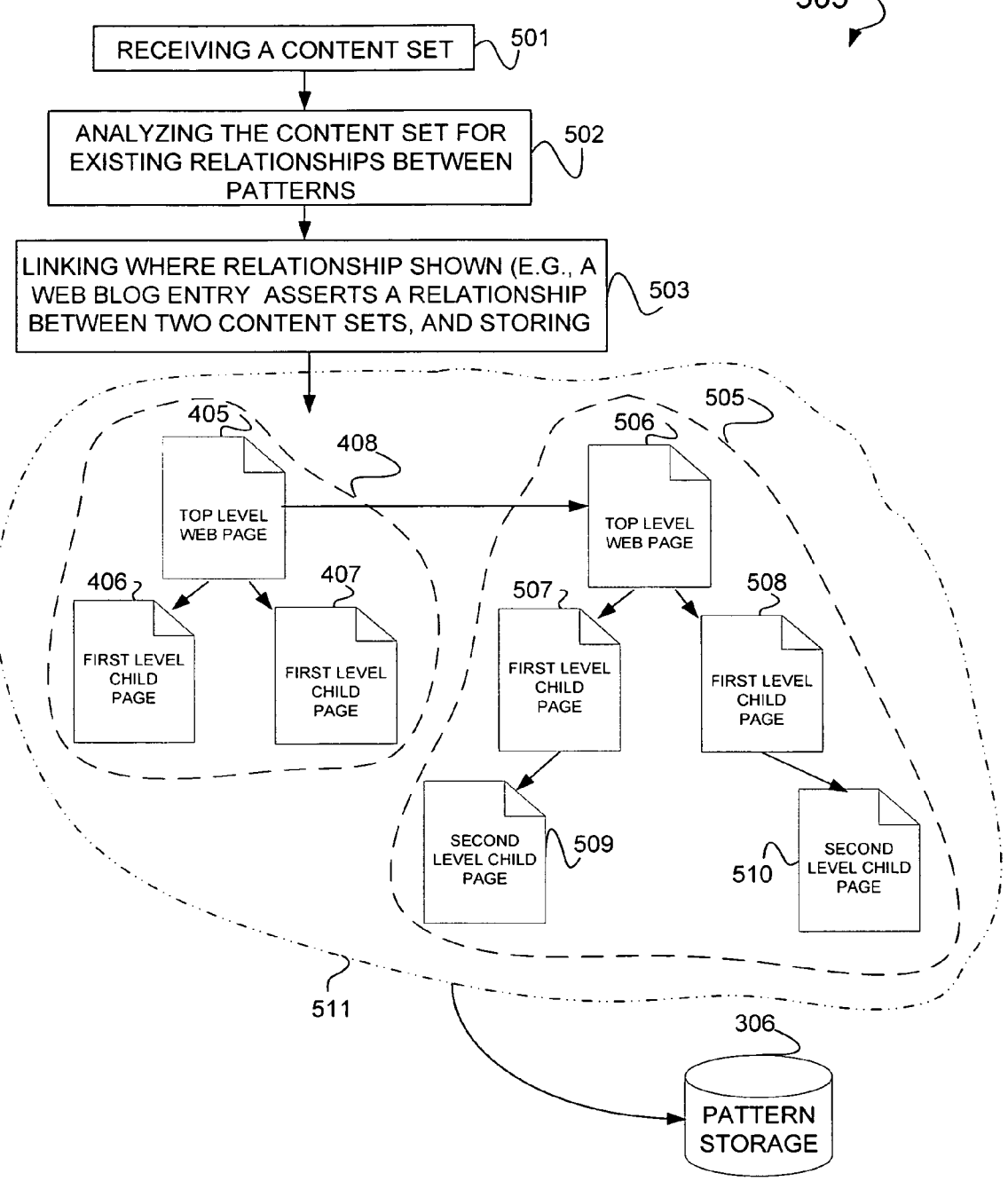
FIG. 5 is a flowchart illustrating a method used to implement operation to perform prospective scanning, according to an embodiment.

FIG. 5 is a flowchart illustrating an example method used to implement operation 305. Illustrated is an operation 501 that receives a content set, where this content set may be for example, content set 301. Operation 502, when executed, analyzes the content set for existing relationships between patterns. Operation 503, when executed, links two or more patterns, or, more specifically, member data and/or entities. Linked tree 511 illustrates the linking of two patterns wherein the previously illustrated tree 408 is linked to a tree 505 With respect to the tree 505, this tree 505 includes a tree that is two levels deep such that a top level page 506 has a first level child page 507, and a first level child page 508. Further, this first level child page 507 has a child referenced as a second level child page 509. Similarly, the first level child page 508 has a second level child page 510. Once linked, this tree 505 is stored into a pattern storage database 306. As previously illustrated, any one of a number of data structures may be used in lieu of the linked tree 511.

Figure 6:
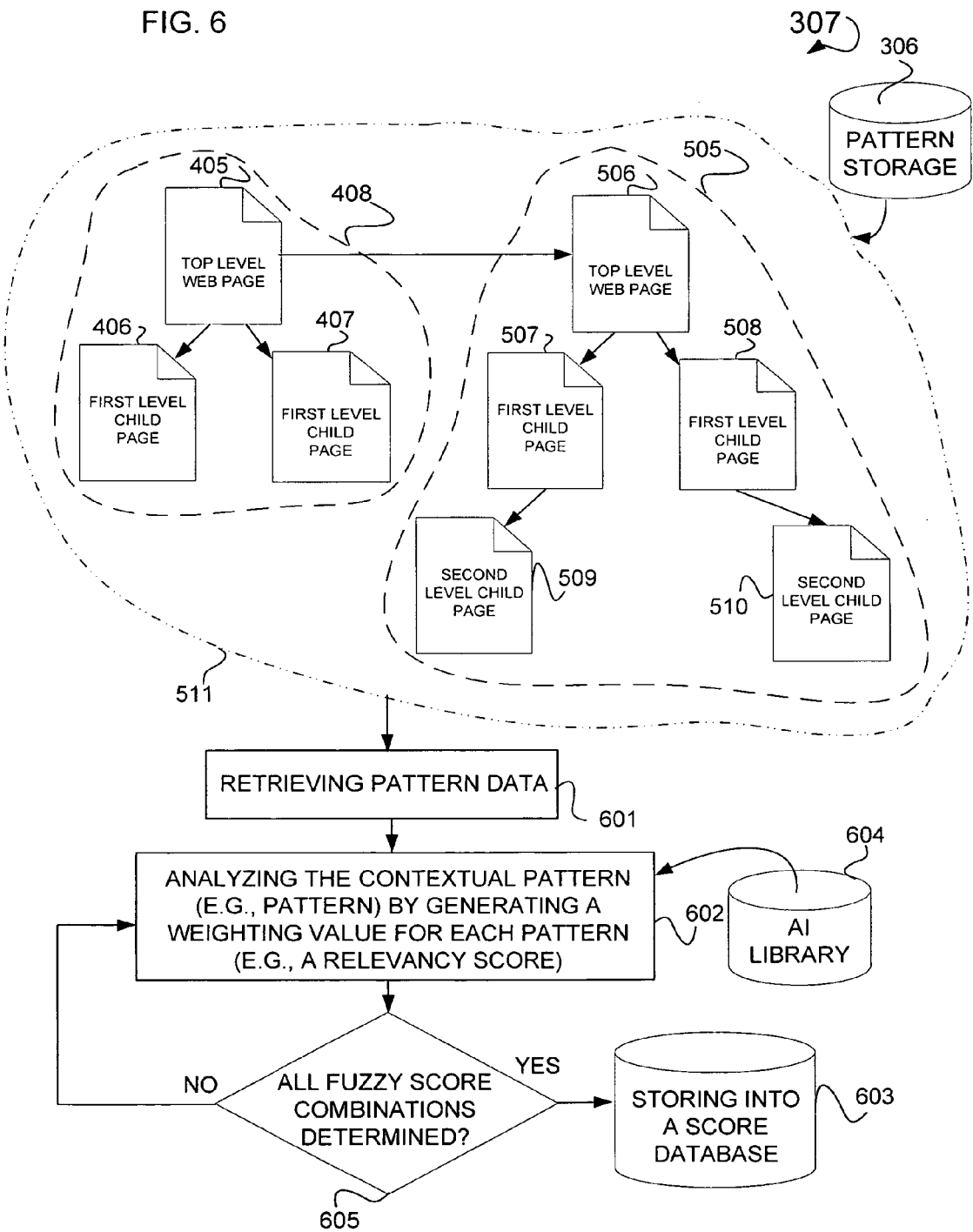
FIG. 6 is a flowchart illustrating a method used to implement an operation to execute a contextual pattern engine, according to an example embodiment.

FIG. 6 is a flowchart illustrating an example method used to implement operation 307. Illustrated here is the execution of a contextual pattern engine wherein the tree 505 is retrieved from a pattern storage database 306 by the execution of operation 601. Operation 602 is executed that analyzes the contextual pattern by generating at least one weighting values for each pattern, wherein these weighting values constitute some type of Fuzzy Logic score. In some example embodiments, as may be more fully illustrated below, this weighting value is associated with the edges or links between each one of the nodes (e.g., web pages that make up, for example, the tree 505. Further, an AI library 604 provides the logic used to generate and assign the Fuzzy Logic score. While, in this case, a Fuzzy Logic paradigm is used to weight the various links between the nodes that make up the tree 505, it is clear that other types of AI algorithms, and/or combinations of AI algorithms may be implemented. Some of these alternative AI algorithms, or combinations of AI algorithms, may be more fully illustrated below.

In some embodiments, once a Fuzzy score is assigned to a particular link between one or more patterns, a decisional operation 605 is executed. In some example cases, the nodes of the tree 505 may be combined in the pair wise manner with all other members of member data sets that exist within the pattern storage database 306. It is a decisional operation 605 that determines whether all pair wise combinations have been executed. In cases where decisional operation 605 evaluates to true or "YES," then the resulting Fuzzy Scores are stored into a scoring database 603. In cases where operation 605 evaluates to false or "NO," then additional pair wise combinations are determined through the re-execution of operation 602.

In some example embodiments, a Fuzzy Logic score, or series of scores, may be generated for the R2 and R3 values. In the case of the R2 value, a Fuzzy Logic Score(s) may be generated for a relationship weighting. Additionally, in the case of the R3 value, a Fuzzy Logic Score(s) may be generated for the review weighting. This Fuzzy Logic Score(s) may be reflected as relevancy scores shown below.

Figure 7:
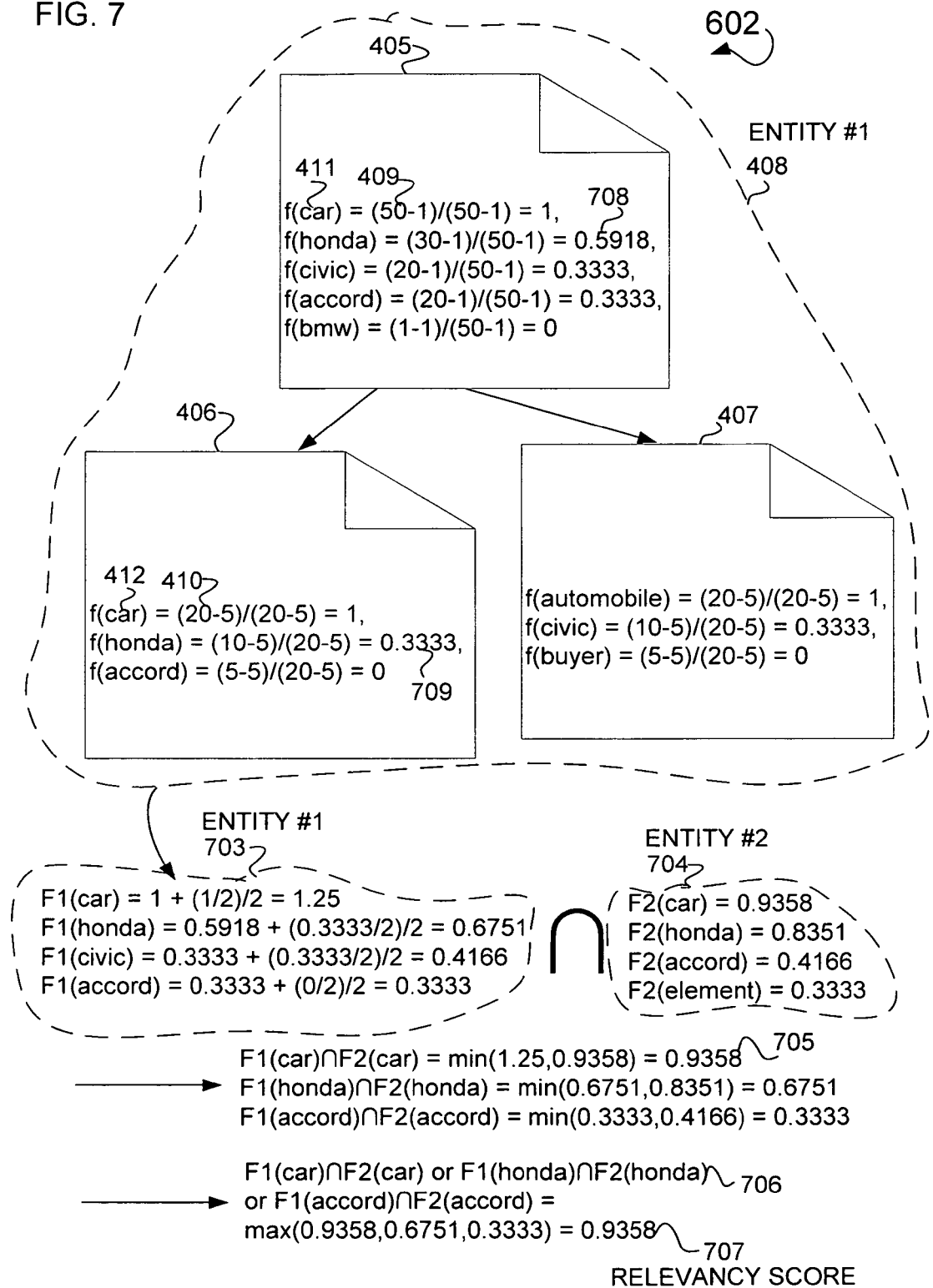
FIG. 7 is a flowchart illustrating an operation, wherein Fuzzy Logic scores are generated and applied to various entities, and the member data that make up these entities, according to an example embodiment.

FIG. 7 is a flowchart illustrating an example operation 602, wherein Fuzzy Logic scores are generated and applied to various entities and the member data that makes up these entities. Illustrated is a tree 408 including a parent node 405, and child nodes 406 and 407. This parent node 405 corresponds to the previously illustrated top level web page, whereas the child nodes 406 and 407 correspond to the previously illustrated first level child pages of the tree 408. In cases where an analysis is performed on a content data set to determine whether there are existing relationships between certain types of patterns, a function, such as function 411, is executed, wherein a count value, such as count value 409, is compared against other types of count values. In some example cases, a value, such as 0.5918 (e.g., 708), results in the execution of one or more of these functions. Similarly, various other types of count values and their respective weighting scores are generated for child nodes. For example, the count value 0.3333 (e.g., 709) may be generated.

In some example cases, once these scores, which are in this case Fuzzy Logic scores, are generated, a logical intersection operation is performed, whereby the intersection between the Fuzzy Logic scores 703 for an Entity #1 is compared to the scores 704 of an Entity #2. Once the logical intersection is found, then the intersection of the various scores is provided to some type of minimization function (e.g., a function that finds a minimum value), and then a resulting value is returned. In some embodiments, this minimization function is an LP algorithm. This resulting value may be, for example, 0.9358 (e.g., 705). In some embodiments, the intersection of all minimum Fuzzy Logic scores for all member data sets for both entities (e.g., Entity #1 and Entity #2) is determined and the results provided to a maximization function. This maximization function may be a LP algorithm in some cases. The value returned form this maximization function is a relevancy score. Here, for example, relevancy score of 0.9358 (e.g., 707) is shown.

Figure 8:
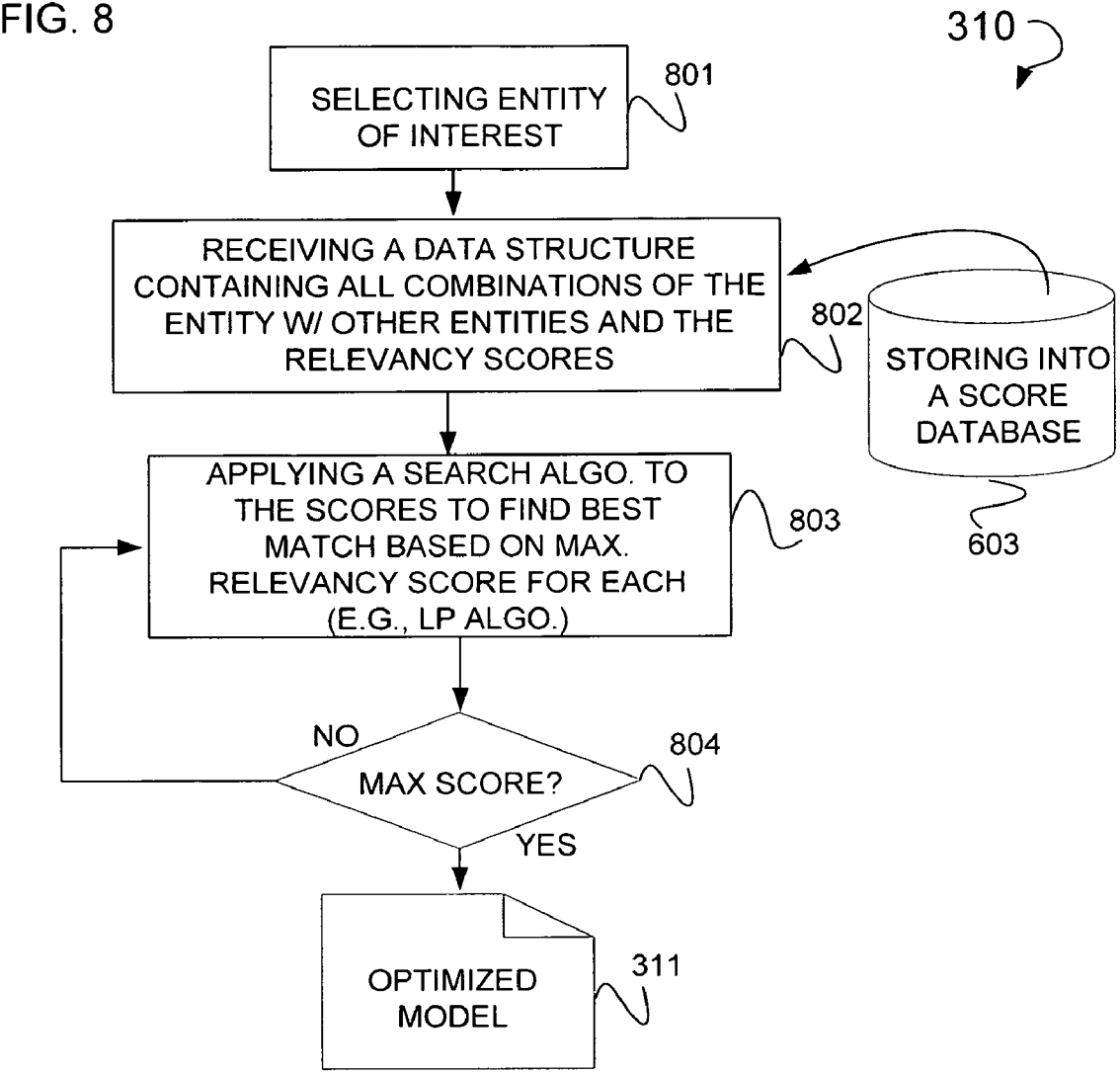
FIG. 8 is a flowchart illustrating the method used to execute an operation to find the best entity of interest, according to an example embodiment.

FIG. 8 is a flowchart illustrating the example method used to execute operation 310. Illustrated is an operation 801 that selects an entity of interest. An operation 802 is executed that receives the data structure including all combinations of the entity of interest with other entities and their relative Relevancy Scores. These Relevancy Scores are obtained from, for example, a score database 603. An operation 803 is executed that applies a search algorithm (e.g., an LP algorithm) to the scores to find the best match in terms of some type of maximum relevancy score for each combination of entities. A decisional operation 804 may be executed wherein where this decisional operation 804 evaluates to false or "NO," the operation 803 is re-executed. In example cases where decisional operation 804 evaluates to true or "YES," then an optimized model 311 is generated.

Figure 9:
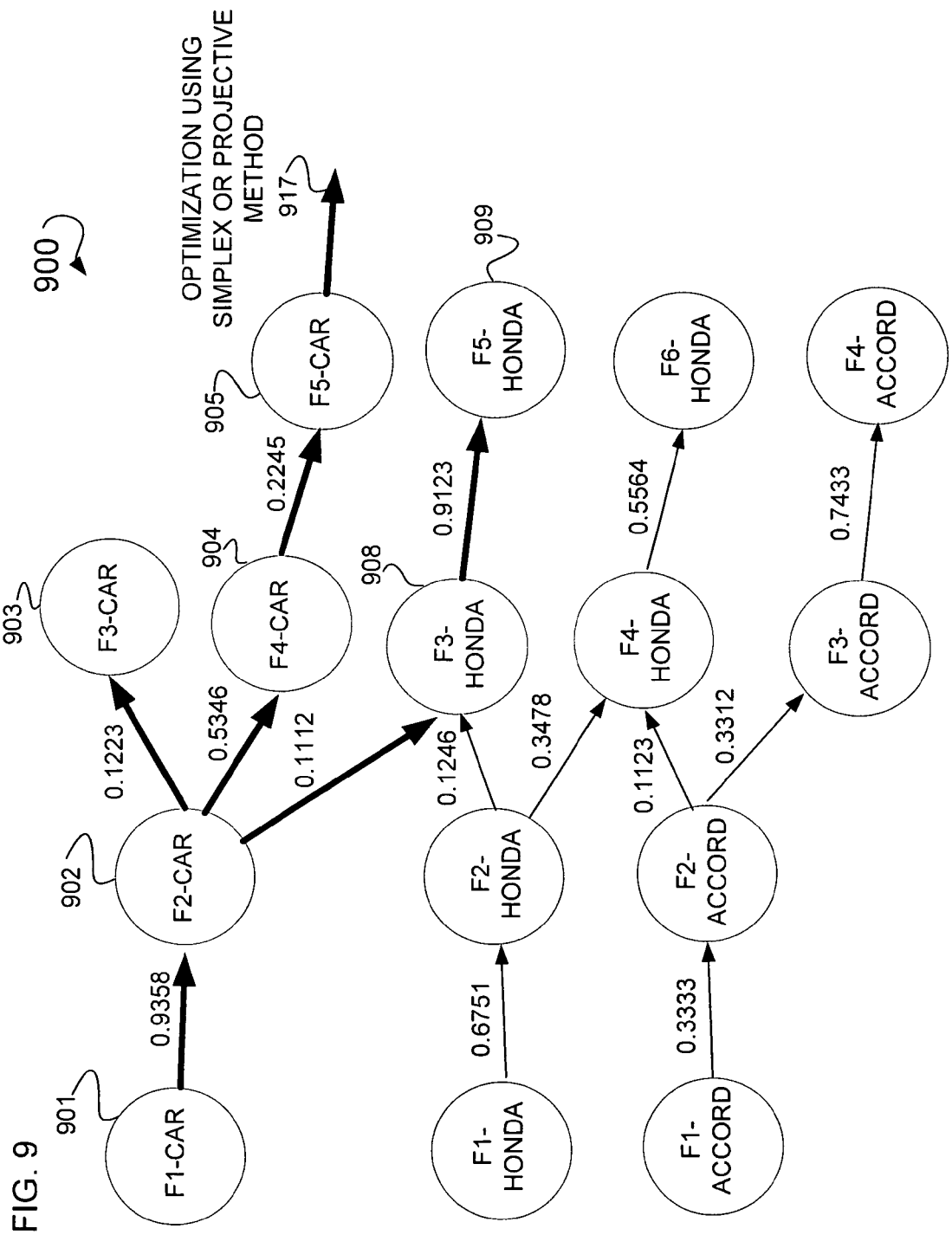
FIG. 9 is an acyclic graph illustrating the execution of a Linear Programming (LP) algorithm, according to an example embodiment.

FIG. 9 is an example acyclic graph 900 illustrating the execution of an LP algorithm. For example, illustrated are various nodes 901 through 915, wherein these nodes reflect various functions relating to certain types of member data (e.g., information relating to automobiles such as Honda automobiles). For example, a node 901 is related to (e.g., linked to) a node 902 via a relevancy score of 0.9358. Further, the node 902 is related to a node 903 via a relevancy score of 0.1223 and node 902 is related to a node 904 via a relevancy score of 0.5346. Additionally, this node 902 is related to a node 908 via a relevancy score of 0.1112. This node 904 is in turn related to a further node 905 via a relevancy score of 0.2245. Additionally, the node 908 is related to a node 909 via a relevancy score of 0.9123. The relationship between these various nodes is in terms of weighted links, where these weighted links contain weighting values illustrating a relevancy score, or value. (See e.g., FIG. 7 illustrating the computation of a relevancy score) As previously illustrated, these relevancy scores are based upon Fuzzy Logic scores associated via each node. Further, in some example cases, an LP algorithm may be used to find a maximum or minimum relevancy score in the graph 900.

FIG. 10 is a diagram of an example optimized model 112. Illustrated is a matrix that contains various data wherein this data represents Relevancy Scores between various combinations of entities. For example, the combination of Entity 1 (e.g., 1001 referenced as E1) and Entity 2(e.g., E2) is referenced as a Relevancy Scores of 0.6751 (e.g., 916). Additionally illustrated are other types of tuples entries, for example, an entity 3(e.g., 1002). In some example cases, no relationship may exist between entities (see e.g., 1003 and 1004). This optimized model 112, and the data included therein (e.g., the Relevancy Scores), may be represented in the form of XML, a flat file, or some other suitable format.

Example Database

Some embodiments may include the various databases (e.g., 109, 304, 306, 603, and 604) being relational databases, or in some cases On Line Analytic Processing (OLAP) based databases. In the case of relational databases, various tables of data are created, and data is inserted into, and/or selected from, these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language may be implemented. In the case of a database using tables and SQL, a database application such as, for example, MYSQL™, SQLSERVER™, Oracle 8I™, or 10G™, or some other suitable database application may be used to manage the data. In the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a Relational Data Schema (RDS) or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Example Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules or processes that govern the software application as a whole. A third tier, a storage tier, may be a persistent storage medium or non-persistent storage medium. One or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer systems as various software components.

Example Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), Java Beans (JB), Enterprise Java Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Example Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system including a logic component (e.g., a logic tier). These first and second computer systems may be configured in a server-client, peer-to-peer, or some other suitable configuration. These various components may be written using the above illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Example System of Transmission Between Server and Client

Some embodiments may utilize the Open Systems Interconnection (OSI) model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some example cases, internet refers to a network of networks. These networks may use a variety of protocols for the exchange of data, including the aforementioned TCP/IP, or some other suitable protocol. These networks may be organized within a variety of topologies (e.g., a star topology) or structures.

Example Market Place Applications

In some embodiments, a system and method for contextual data mapping, searching, and data retrieval is illustrated. In one embodiment, a user may become an entity (e.g., utilize an account setup interface 102) within the system by supplying a member data set in the form of web pages, JPEG files, or other suitable data in a binary form. Once supplied, the user may seek to determine the relevancy (e.g., by using a search query and results interface 114) (R1), structural relevance (R2), or co-related relevancy (R3) values between themselves and some other user. In this context, a system or method for social networking is provided.

In still other embodiments, a user may seek to conduct a search (i.e., an internet search) for digital content based upon one or more of R1, R2, and/or R3 such that a user may be able to retrieve optimized search results wherein the results are optimized using one or more of the above illustrated AI algorithms. For example, a user may search for the text string "Blue Honda Accord" and retrieve a JPEG file including a picture of a Blue Honda Accord, wherein the only correspondence between the text string and the JPEG is the subject matter (e.g., the JPEG itself contains no text string in the form of "Blue Honda Accord").

Example Computer System

The present invention is implemented on a digital processing system or computer system that includes a processor, which may represent one or more processors and may include one or more conventional types of such processors (e.g., x86, x86-64, ARMx), such as an AMD Processor, Intel Pentium or XScale Processor, or other suitable Processor. A memory is coupled to the processor by a bus. The memory may be a Dynamic Random Access Memory (DRAM) and/or may include static RAM (SRAM). The processor may also be coupled to other types of storage areas/memories (e.g., cache, flash memory, disk, etc.), which could be considered part of the memory or separate from the memory.

In some embodiments, a bus further couples the processor to a display controller, a mass memory or some type of computer-readable medium device, a modem or network interface card or adaptor, and an input/output (I/O) controller. The display controller controls, in a conventional manner, a display, which may represent a Cathode Ray Tube (CRT) display, a Liquid Crystal Display (LCD), a plasma display, or other type of suitable display device. Computer-readable medium may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an internet. The I/O controller controls I/O device(s), which may include one or more keyboards, mouse/trackball or other pointing devices, magnetic and/or optical disk drives, printers, scanners, digital cameras, microphones, etc.

The present system and method may be implemented entirely in executable computer program instructions that are stored on a computer-readable medium or may be implemented in a combination of software and hardware, or in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage media such as RAM, ROM, EPROM (Erasable Programmable Read-Only Memory), CD-ROM or other optical-disk storage, magnetic-disk storage or other magnetic-storage devices, or any other media that can be used to carry or store desired program code means in the form of computer-executable instructions, computer-readable instructions, or data structures and that may be accessed by a general-purpose or special-purpose computer system. This physical storage medium may be fixed to the computer system, as in the case of a magnetic drive, or removable, as in the case of an EEPROM (Electrically Erasable Programmable Read-Only Memory) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data that cause a general-purpose computer system or special-purpose computer system to perform a certain function or group of functions. The computer-executable or computer-readable instructions may be, for example, binaries or intermediate format instructions such as assembly language, or even source code.

In this description and in the following claims, a computer system is defined as one or more software modules, one or more hardware modules, or combinations thereof that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or personal digital assistant (PDA)) where internal modules (e.g., a processor and memory) work together to perform operations on electronic data.

Some embodiments may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, or other suitable environment. Some embodiments may be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see above).

Figure 11:
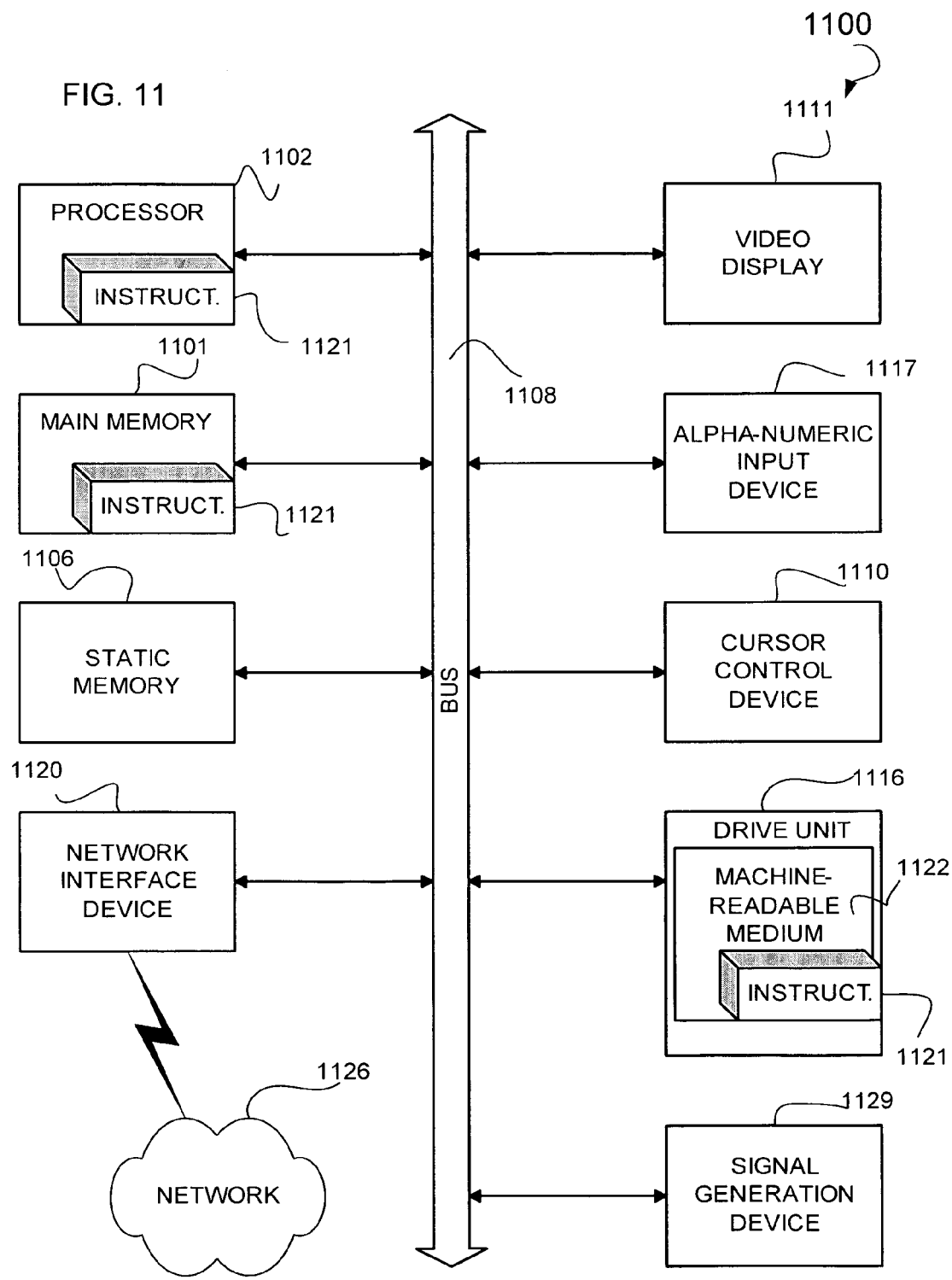
FIG. 11 shows a diagrammatic representation of a machine in the example form of a computer system within which a set of instructions for causing the machine to perform any one or more of the methodologies discussed herein may be executed, according to an example embodiment.

FIG. 11 shows a diagrammatic representation of a machine in the example form of a computer system 1100 within which a set of instructions for causing the machine to perform any one or more of the methodologies discussed herein may be executed. In some embodiments, this computer system 1100 may incorporate the functionality and associated modules illustrated in FIGS. 2 and 3. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

The example computer system 1100 includes a processor 1102 (e.g., a Central Processing Unit (CPU), a Graphics Processing Unit (GPU) or both), a main memory 1101 and a static memory 1106, which communicate with each other via a bus 1108. The computer system 1100 may further include a video display unit 1111 (e.g., a LCD or a CRT). The computer system 1100 also includes an alphanumeric input device 1117 (e.g., a keyboard), a User Interface (UI) cursor controller 1110 (e.g., a mouse), a disk drive unit 1116, a signal generation device 1129 (e.g., a speaker) and a network interface device (e.g., a transmitter) 1120.

The disk drive unit 1116 includes a machine-readable medium 1122 on which is stored one or more sets of instructions (such as instructions 1121) and data structures (e.g., software) embodying or used by any one or more of the methodologies or functions illustrated herein. The software may also reside, completely or at least partially, within the main memory 1101 and/or within the processor 1102 during execution thereof by the computer system 1100, the main memory 1101, and the processor 1102 also constituting machine-readable media.

The instructions 1121 may further be transmitted or received over a network 1126 via the network interface device 1120 using any one of a number of well-known transfer protocols (e.g., Hyper Text Transfer Protocol (HTTP) or Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any of the one or more methodologies illustrated herein. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
receiving a first content set, wherein the first content set is organized according to a rules set;
using the rules set to parse the first content set to generate a first pattern set having a plurality of members;
assigning a weighted value to each member of the first and a second pattern set based on a frequency of occurrence of each member in the first and second pattern sets, wherein each member of the first and second pattern sets includes digital content; and
determining a relevancy score linking each of the members of the first and second pattern sets in a one to one mapping of the members of the first pattern set to each of the members of the second pattern set, wherein the relevancy score is based upon the weighted value assigned to each member of the first and second pattern sets and represents a relationship between the members of the first and second pattern sets,
wherein determining includes using at least one of a contextual pattern operation; a structural relationship operation; a perspective operation; or combinations thereof; and
wherein assigning a weighted value determining the relevancy score includes applying a formula of $P_n = \Sigma f_i p_i / n$, where: n is the total number of known patterns in the system; i is 0 to n; $p_i$ is 1 if the bit pattern or co-related patterns exists; and f is the fuzziness of a pattern towards another pattern, and wherein determining a relevancy score includes performing a union function on the weighted values.

2. The computer implemented method of claim 1, further comprising storing each member of the first and second pattern sets in a data structure.

3. The computer implemented method of claim 2, further comprising executing an algorithm to find a highest relevancy score linking a member of the first pattern set and a member of the second pattern set.

4. The computer implemented method of claim 3, wherein the algorithm is a linear programming algorithm.

5. The computer implemented method of claim 3, further comprising presenting the highest relevancy score for one or more members of the first and second pattern sets as an optimized model.

6. The computer implemented method of claim 1, further comprising assigning the weighted value based upon one or more weighting types including at least one of relevance weighting, relationship weighting, and review weighting.

7. The computer implemented method of claim 1, wherein the weighted value includes a Fuzzy Logic score.

8. The computer implemented method of claim 1, further comprising applying one or more constraint values to the relevancy score, wherein the constraint value is selected from a group of constraint values consisting of a fastest to locate value, an ease of access value, and a co-expected relevancy value.

9. The computer implemented method of claim 1, wherein the digital content includes at least one of on-line blog entries, on-line chat entries, on-line bulletin board postings, and social network postings.

10. The method of claim 1, wherein determining the relevancy score includes performing a logical intersection of the weighted value between the members of the first and second pattern set, applying a minimization function to the logical intersection to produce a minimized output, and applying a maximization function to the minimized output to produce the relevancy score.

11. A computer system comprising:
a receiver residing on the computer system to receive a first content set and store the first content set in a memory, wherein the first content set is organized according to some rules set;
a parser to parse the first content set to generate a first pattern set;
an assignor residing on the computer system and including a processor to assign a weighted value to each member of the first and a second pattern sets based on a frequency of occurrence of each member in the first and second pattern sets, wherein each member of the first and second pattern sets includes digital content;
a first calculator, including a processor, residing on the computer system to determine a relevancy score linking each of the members of the first and second pattern sets in a one to one mapping of the members of the first pattern set to each of the members of the second pattern set, wherein the relevancy score is based upon the weighted value assigned to each member of the first and second pattern sets and represents a relationship between the members of the first and second pattern sets, wherein the first calculator uses at least one of a contextual pattern operation; a structural relationship operation; a perspective operation; or combinations thereof; and
wherein the assignor is to assign the weighted value determining the relevancy score by applying a formula of $Pn = \Sigma fipi/n$, where: n is the total number of known patterns in the system; i is 0 to n; pi is 1 if the bit pattern or co-related patterns exists; and f is the fuzziness of a pattern towards another pattern, and wherein determining a relevancy score includes performing a union function on the weighted values.

12. The computer system of claim 11, further comprising a database, including a memory, operatively coupled to the computer system to store each member of the first and second pattern sets in a data structure.

13. The computer system of claim 12, further comprising a second calculator, residing on the computer system and including a processor, to traverse the data structure using an algorithm to find a link representing a highest relevancy score between a member of the first pattern set and a member of the second pattern set.

14. The computer system of claim 13, wherein the algorithm is a linear programming algorithm.

15. The computer system of claim 13, further comprising a model generator, residing on the computer system and including a processor, to present the highest relevancy score for one or more members of the first and second pattern sets as an optimized model.

16. The computer system of claim 11, further comprising a third calculator, residing on the computer system and including a processor, to assign the weighted value based upon one or more weighting types including at least one of relevance weighting, relationship weighting, and review weighting.

17. The computer system of claim 11, wherein the weighted value includes a fuzzy logic score.

18. The computer system of claim 11, further comprising a fourth calculator, residing on the computer system and including a processor, to apply one or more constraint values to the relevancy score, wherein the one or more constraint value is selected from a group of constraint values consisting of a fastest to locate value, an ease of access value, and a co-expected relevancy value.

19. The computer system of claim 11, wherein the digital content includes at least one of web pages, on-line blog entries, on-line chat entries, on-line bulletin board postings, and social network postings.

20. The computer system of claim 11, wherein the first calculator is to calculate using all of a total number of known patterns in the system, whether a bit pattern or co-related pattern exists, fuzziness value of one pattern to another pattern, and a union function.

21. An apparatus comprising:
means for receiving a first content set and storing the first content set in a memory, wherein the first content set is organized according to a rules set;
means for using the rules set and a processor to parse the first content set to generate a first pattern set having a plurality of members;
means for assigning a weighted value to each member of the first and a second pattern set based on a frequency of occurrence of each member in the first and second pattern sets, wherein each member of the first and second pattern sets includes digital content, wherein the means for assigning includes a processor; and
means for determining a relevancy score linking each of the members of the first and second pattern sets in a one to one mapping of the members of the first pattern set to each of the members of the second pattern set, wherein the relevancy score is based upon the weighted value assigned to each member of the first and second pattern sets and represents a relationship between the members of the first and second pattern sets, wherein the means for determining includes a processor;
wherein the means for assigning a weighted value determining the relevancy score includes means for applying a formula of $P_n = \Sigma f_i p_i / n$, where: n is the total number of known patterns in the system; i is 0 to n; $p_i$ is 1 if the bit pattern or co-related patterns exists; and f is the fuzziness of a pattern towards another pattern, and wherein determining a relevancy score includes performing a union function on the weighted values.

22. A non-transitory machine-readable storage medium comprising instructions, which when implemented by one or more machines, cause the one or more machines to perform the following operations:
receive a first content set, wherein the first content set is organized according to a rules set;
use the rules set to parse the first content set to generate a first pattern set having a plurality of members;
assign a weighted value to each member of the first and a second pattern set based on a frequency of occurrence of each member in the first and second pattern sets, wherein each member of the first and second pattern sets includes digital content; and
determine a relevancy score linking each of the members of the first and second pattern set in a one to one mapping of the members of the first pattern set to each of the members of the second pattern set, wherein the relevancy score is based upon the weighted value assigned to each member of the first and second pattern sets and represents a relationship between the members of the first and second pattern sets;
wherein the assign operation includes applying a formula of $P_n = \Sigma f_i p_i / n$, where: n is the total number of known patterns in the system; i is 0 to n; $p_i$ is 1 if the bit pattern or co-related patterns exists; and f is the fuzziness of a pattern towards another pattern, and wherein determining a relevancy score includes performing a union function on the weighted values.

* * * * *